US009753817B2

(12) United States Patent
Jain et al.

(10) Patent No.: US 9,753,817 B2
(45) Date of Patent: Sep. 5, 2017

(54) SYSTEM AND METHOD FOR SYNCHRONIZING LINKS AND ATTACHMENTS BETWEEN TWO COMPUTING DEVICES

(71) Applicant: OPSHUB, INC., Palo Alto, CA (US)

(72) Inventors: Sandeep Jain, Palo Alto, CA (US);
Anil Babubhai Savani, Ahmedabad (IN)

(73) Assignee: OPSHUB, INC., Palo Alto, CA (US)

( * ) Notice: Subject to any disclaimer, the term of this patent is extended or adjusted under 35 U.S.C. 154(b) by 34 days.

(21) Appl. No.: 14/486,162

(22) Filed: Sep. 15, 2014

(65) Prior Publication Data

US 2015/0082100 A1 Mar. 19, 2015

Related U.S. Application Data

(60) Provisional application No. 61/878,653, filed on Sep. 17, 2013.

(51) Int. Cl.
*G06F 11/00* (2006.01)
*G06F 11/14* (2006.01)
*G06F 17/30* (2006.01)

(52) U.S. Cl.
CPC .... *G06F 11/1464* (2013.01); *G06F 17/30174* (2013.01)

(58) Field of Classification Search
USPC .......................................................... 714/57
See application file for complete search history.

(56) References Cited

U.S. PATENT DOCUMENTS

| | | | |
|---|---|---|---|
| 2006/0171420 A1* | 8/2006 | Chu | H04L 12/58 370/503 |
| 2007/0220062 A1* | 9/2007 | Carberry | G06F 17/30578 |
| 2009/0325609 A1* | 12/2009 | Rosen | H04L 63/105 455/466 |
| 2012/0011399 A1* | 1/2012 | Park | G06F 11/1443 714/16 |
| 2012/0066576 A1* | 3/2012 | Zhu | G06F 17/30864 715/206 |
| 2012/0246519 A1* | 9/2012 | Savov | G06F 11/3664 714/46 |
| 2012/0331344 A1* | 12/2012 | Dobbelstein | G06F 11/3419 714/28 |

(Continued)

*Primary Examiner* — Sarai Butler
(74) *Attorney, Agent, or Firm* — Barry Choobin; Patent 360 LLC

(57) ABSTRACT

The various embodiments herein provide a method and system for synchronization of links and attachments during synchronization between source and target devices. The system for executing synchronization between the source and target devices comprises a connector framework, a process framework, a mapping manager, a recovery manager, a conflict manager and a failure manager. The method comprises getting the "as of state" of the attachment that is old and new attachment information list for the revisions, then the system having history for the attachment constructs "as of state" and send as part of the event and system not having history for the attachment, stores attachment information in the history state table with the source update time information in poller as well as the time of adding attachment from the adapter.

12 Claims, 5 Drawing Sheets

(56) References Cited

U.S. PATENT DOCUMENTS

| | | | |
|---|---|---|---|
| 2013/0173720 A1* | 7/2013 | Vasudev | H04L 12/5825 709/206 |
| 2013/0238657 A1* | 9/2013 | Brand | G06F 17/30457 707/770 |
| 2014/0380192 A1* | 12/2014 | Shukla | G06Q 10/06 715/753 |

* cited by examiner

SYSTEM AND METHOD FOR SYNCHRONIZING LINKS AND ATTACHMENTS BETWEEN TWO COMPUTING DEVICES

CROSS REFERENCE TO RELATED APPLICATIONS

This patent application claims the priority of the U.S. Provisional Patent Application No. 61/878,653 filed on Sep. 17, 2013, having the title "System and Method for Synchronization of Links and Attachments Between Two Systems", and the content of which is incorporated herein by reference in its entirely.

BACKGROUND

Technical field

The embodiments herein generally relate to a method of synchronizing and integrating a data. The embodiments herein particularly relate to a method of synchronizing the data between the source and the target devices. The embodiments herein more particularly relate to a system and method for synchronization of links and attachments during synchronization between two computing devices.

Description of the Related Art

In the existing attachment synchronization techniques, the attachments which are not added by integration are not deleted. As a result of which, the following use cases do not work. This is required to support a bidirectional attachment synchronization where the attachment can be added/removed from any of the system in integration. An attachment is carried out by the user when file 1 with updated Entity A is added to a System1. The attachment is carried out, when the changes of entity A is synchronized in System2. The attachment is carried out by the user, when the attachment file1 is deleted from entity A in the System2, and changes in System1 are synchronized. Since the file 1 in System1 is not added by integration user, it is Jo not removed as part of delete operation in System2. Moreover, when the entity A is polled again from System1, the File1, which was deleted by an X user, is again added in the System2.

For the synchronization of the links and attachments, there are various constraints from the different system API to support fully functional bidirectional sync of the links and attachments. The constraints are that many of the systems doesn't maintain the history for the links, updated operations i.e. link added, updated or removed; many of the systems doesn't provide information about which user added links mans of the systems doesn't provide information about at what time the link was added, and many of system don't provide any history of link change information and of those which provide history of link change information, many of the systems doesn't provide the history of link change information from both the linked entities. Even though Child entity e2 is added on the entity e1, the link history information is available from the entity e2 only but not from the e1. As a result, no child history information is available during syncing of e1, many of the systems don't allow adding link from the both entities and many of the systems don't support attachment update operation.

Hence, there is a need for a system and method for synchronization of links and attachments during synchronization between at-least two systems. There is also a need for a method for properly handling recovery of links updates during bidirectional synchronization. Further, in case of addition of link between entities in one system and the link between the entities was removed in the other system, and then "link remove" must be synced to the other system. When the link is added between the entities in one system and the opposite entity is updated to remove the link in the other system, then "link remove" must be synced to the other system. When the link, is updated in the source system during the sync operation and the link is removed in the other system, then these results as conflict in the link. While syncing historical data for the system which does not support history, then an eventual synchronization of the link is happened, when the linked entity actually get synced to the other system. Further, there is also need for a method to recovery data in case of the failure in between the processing of the links.

Further, there is also a need for a method for efficiently handling recovery of attachments during bidirectional synchronization. Further, when the attachments are added in the source system which is synced to other system and its content was updated in the target system, then the original attachment must be updated with the new content. Further, in case where attachment was added in the source system, which is synced to other system and delete operation as performed in the target system, then the original attachment must be deleted. Further, in case where attachment was added in the source system which is synced, the attachment was updated in the source system and the attachment is synced with a new content in target system even though target system is not ha mg support for the update attachment, their exits a need for a method for handling recovery of attachments. Further, in case where attachment was added in source system, same attachment was with different content was added in the other system, and then this conflict must be detected for the attachment. Further, in case where attachment was updated in the source system, the same attachment was with different content was updated in the other system, and then this conflict must be detected for the attachment. Further, in case where attachment was updated in the source system, the same attachment was deleted in the other system, and then this conflict must be detected for the attachment.

The above mentioned shortcomings, disadvantages and problems are addressed herein and which will be understood by reading and studying the following specification.

OBJECTIVES OF THE EMBODIMENTS

The primary object of the embodiments herein is to provide a system and method for synchronization of links and attachments during synchronization between at-least two computing devices.

Another object of the embodiments herein is to provide a method for handling the recovery from failures during bidirectional link synchronization.

Yet another object of the embodiments herein is to provide a method for handling a recovery from failures during bidirectional attachment synchronization.

Yet another object of the embodiments herein is to provide a method for detecting con flirts during bidirectional attachment synchronization.

Yet another object of the embodiments herein is to provide a method for detecting conflicts in links luring bidirectional synchronization.

These and other objects and advantages of the embodiments herein will become readily apparent from the following detailed description taken in conjunction with the accompanying drawings.

SUMMARY

The various embodiments of the present disclosure provide a system and method for synchronization of links and attachments during synchronization between two devices. The system for synchronizing links and attachments between two computing devices comprises a connector framework, a process framework, a mapping manager, a recovery manager, a conflict manager, a failure manager and an admin module. The connector framework is configured to provide connectivity between a source device and a target device. The connector framework further comprises poller components and adapter components. The poller components are responsible for reading the data changes from the source devices. The adapter components are responsible for writing the data to the destination devices. The process framework is responsible for processing the polled event. The process framework further comprises one or more process engines and one or more rules engines such as but not limited to MOSS, JPDL, Drools, Apache ODE, etc. All the components in the synchronization system are loosely coupled, and hence the processing engines can be switched easily. Further, the process framework on successful synchronizing event, writes back to the source to stating or indicating success and on failure, the process framework passes to failure management component. The mapping manager is configured to map a plurality of fields of the source device to the corresponding fields of the target device. The recovery manager is configured to recover data in case of system failure or any unexpected failures. The conflict manager is configured to manage a plurality of conflicts occurring during synchronization and producing at least one integration model to resolve the plurality of conflicts automatically. The failure manager is configured to manage a plurality of failed events occurring during synchronization. The failed events are stored in a failure queue and are accordingly processed by human intervention through an admin module. The system further comprises a poller module configured for initiating a plurality of events relating to synchronization of links and attachments and a system adapter configured fir exchanging attachments and links between the source device and the target device. The system further comprises a database for maintaining information pertaining to the plurality of attachment and links stored in the source device and the target device.

According to one embodiment herein, the system further comprises a data base for storing a context table which is stored with a plurality of attachments and links. The process framework is allowed for querying the table from the poller and the adapter.

According to one embodiment herein, the process framework comprises a process engine and a rules engine. The process framework writes back the target entity link to the source on successful synchronizing event. The rules engine passes the failure event to failure manager.

According to one embodiment herein, the mapping manager comprises transformation field mapping services and user mapping services for mapping different fields of source device to corresponding field of target devices.

According to one embodiment herein, the system adapter receives an old attachment information list and a new attachment information list from the source device and a current attachment information list from the target device. The old attachment information list and the new attachment information list are compared and the attachments are updated on the target device, according to the current attachment information list.

According to (lie embodiment herein, an Application Program Interface (API) is adopted for supporting bi-directional function support. The API checks for an availability of an attachment history for to obtaining an old list and a new list of the attachments. An old attachment information list is retrieved from the source device when the attachment history is available. The old attachment information list is stored in the database on event generation when the attachment history is not available.

According to one embodiment herein, the system adaptor checks whether the attachment update and delete options are supported in the target device. The system adaptor returns a binary value for indicating an availability of the update and delete option.

According to one embodiment herein, the system adaptor performs a delete operation on the old attachment followed by adding the updated attachment to the target device, when the update option is not supported by the target system. The system adaptor performs a skip operation, when both the delete and update options are not available at the source device and target device.

According to one embodiment wherein, the system adapter lists the current attachments available at the target device. Each attachment is assigned with an attribute value, a file, name and a creation/updation time. The creation/updation time is changed at every add and update operation of the attachment.

According to one embodiment herein, the system adapter provides an option for adding and removing links. The system adapter checks for availability of the link addition and removal support at the source computing device and target computing device.

According to one embodiment herein, the system comprises a core adapter for saving a bulk of old link states between a primary entity and a linked entity in a single transaction. The core adaptor stores the old link states in the database and the poller retrieves the old link states from the database based on history available flag. The old link states are retrieved based from source device if history is available. The old link states are retrieved from database if link history is not available.

According to one embodiment herein, the system further comprises a history interface used by the poller and the system adapter to store the link history and the attachment history in the database.

According to one embodiment it herein, a method for processing of attachments during synchronization between a source device and a target device. The method comprises the steps of polling a plurality of attachments by a source device. An old attachment information list and a new attachment information list are received from the source device, after polling event. A current attachment information list is received from the target device. The add attachment operation is performed on the attachment obtained from new attachment information list, when the old attachment information list is different from the new attachment information list and an attachment does not exist in the target device. The update attachment operation is performed on the attachment obtained from new attachment information list that exists in the target, when the old and new attachment information lists information are different. The delete operation is performed followed by the add attachment operation on the attachment, when the update operation is not supported at the source device and the target device. Any operation for the attachment is skipped, when a delete operation is not supported and only an add attachment is supported. The delete attachment operation is performed, when the attachment does not exists in the new attachments list and attachment exists in the current attachment information list for each attachment in the old attachment information list. The old state is saved in the database after processing all the attachments in the current attachment information list, for selecting, the attachment object by the target device.

According to one embodiment herein, a method for recovering attachments from failures during synchronization between a source device and a target device. The method comprises the steps of storing an attachment index from an incoming list as a sub step number after adding each attachment to a target device. An event is retried during which a failure had occurred. The processing of the first attachment from the incoming list is skipped and the processing is continued with the second attachment in the list, when a failure occurs during an addition of a second attachment after adding one attachment. The failure event is recovered, when a failure happens after adding one attachment and before adding the attachment to the database. The current attachment is acquired from the target device. The first attachment which matches with the file name of the current attachment is acquired while recovering the attachment from the incoming list. The attachment is updated during the system recovery, when the updating times of old and new attachments coming from the source device are different.

According to one embodiment herein, a method for detecting conflicts in attachments during synchronization between the source device and the target device. The method comprises the steps of detecting conflict on per attachment basis on a plurality of attachment file names and updated time. A changed attachment information list is prepared, by comparing an old attachment and a new attachments information list to remove all the attachments having same file name and last update time. An update-delete conflict operation is performed on the attachment, when the attachment update time is different for old and new attachment information lists and an attachment does not exist in the target device. A delete-update conflict operation is performed on the attachment, when the attachment is not present in the old list but the attachment is present in the target device. The delete-delete conflict operation is performed on the attachment, when the attachment is deleted from the source device and also does not exist in the target device.

According to one embodiment herein, the type of conflict comprises an add-add conflict, in which link is added in the source device and the same link exists in the target device; an update-delete conflict, in which the link is updated in the source device, and the same is in deleted in the target device; and a delete-delete conflict, in which the link is deleted in the source device and the same is already deleted in the target device.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur those skilled in the art from the following description of the preferred embodiment and the accompanying drawings in which.

Figure 1:
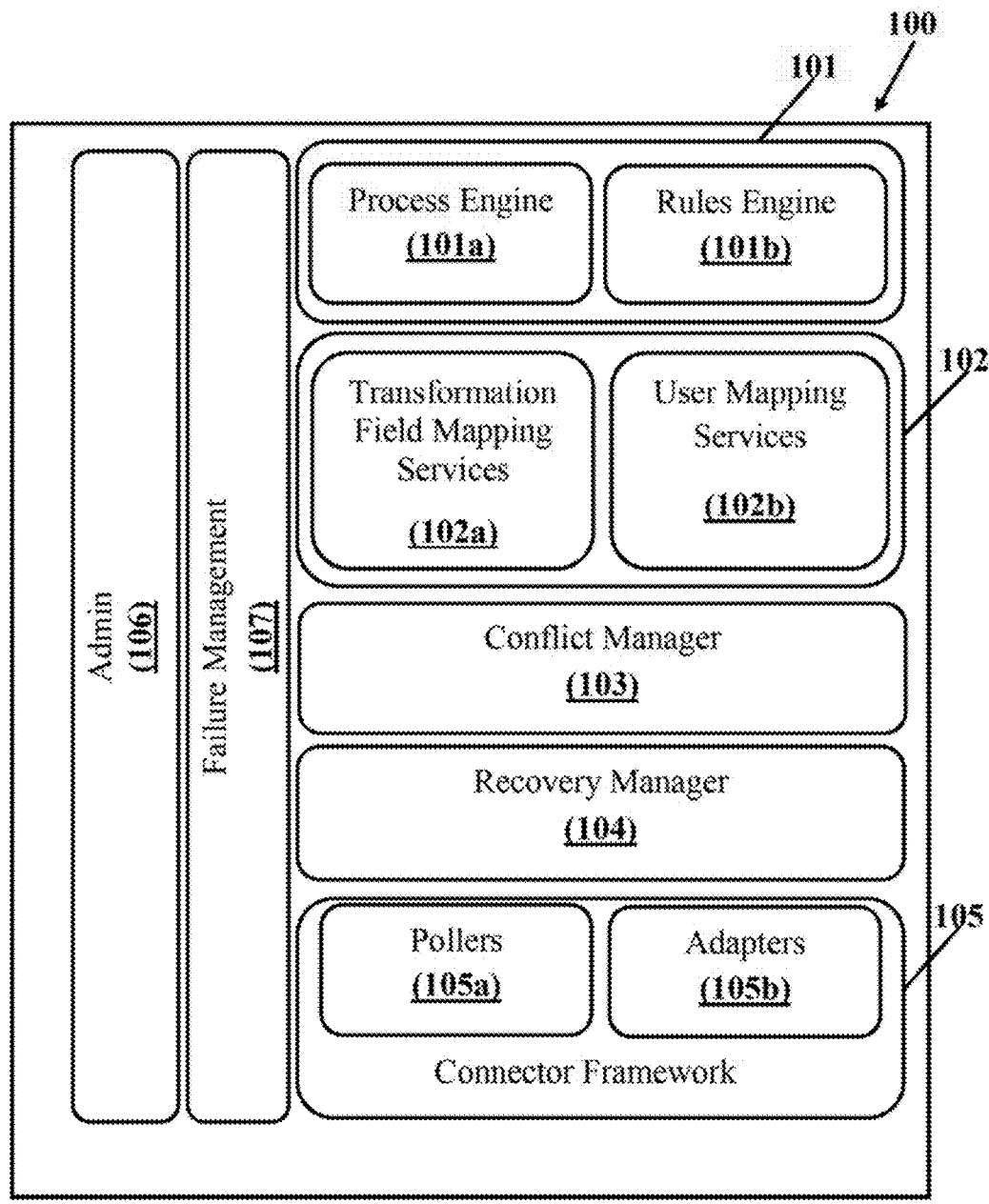
FIG. 1 illustrates a block diagram of a system for synchronization of links and attachments between the source and the target devices, according to one embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

In the following detailed description, reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments of the present disclosure provide a system and method for synchronization of links and attachments during synchronization between two devices. The system for synchronizing links and attachments between two computing devices comprises a connector framework, a process framework, a mapping manager, a recovery manager, a conflict manager, a failure manager and an admin module. The connector framework is configured to provide connectivity between a source device and a target device. The connector framework further comprises poller components and adapter components. The poller components are responsible for reading the data changes from the source devices. The adapter components are responsible for writing the data to the destination devices. The process framework is responsible for processing the poll event. The process framework further comprises one or more process engines and one or more rules engines such as but not limited to JBOSS, JPDL, Drools, Apache ODE, etc. All the components in the synchronization system are loosely coupled, and hence the processing engines, are switched easily. Further, the process framework on successful synchronizing event, writes back to the source stating or indicating success and on failure, the process framework passes to failure management component. The mapping manager is configured to map a plurality of fields of the source device to the corresponding fields of the target device. The recovery manager is configured to recover data in case of system failure or any unexpected failures. The conflict manager is configured to manage a plurality of conflicts occurring during synchronization and producing at least one integration model to resolve the plurality of conflicts automatically. The failure manager is configured to manage a plurality of failed events occurring during synchronization. The failed events are stored in a failure queue and are accordingly processed by human intervention through an admin module. The system further comprises a poller module configured for initiating a plurality of events relating to synchronization of links and attachments and a system adapter configured for exchanging attachments and links between the source device and the target device. The system further comprises a database for maintaining information pertaining to the plurality of attachment and links stored in the source device and the target device.

According to one embodiment herein, the system further comprises a data base for storing a context table which is stored with a plurality of attachments and links. The process framework is allowed for querying the table from the poller and the adapter.

According to one embodiment herein, the process framework comprises a process engine and a rules engine. The process framework writes back the target entity link to the source on successful synchronizing event. The rules engine passes the failure event to failure manager.

According to one embodiment herein, the mapping manager comprises transformation field mapping services and user mapping services for mapping different fields of source device to corresponding field of target devices.

According to one embodiment herein, the system adaptor receives an old attachment information list and a new attachment information list from the source device and a current attachment information list from the target device. The old attachment and the new attachment information list are compared and the attachments are updated on the target device, according to the current attachment information list.

According to one embodiment herein, an Application Program Interface (API) is adopted for supporting bi-directional function support. The API checks for an availability of an attachment history for obtaining an old list and a new list of the attachments. An old attachment information list is retrieved from the source device when the attachment history is available. The old attachment information list is stored in the database on event generation when the attachment history is not available.

According to one embodiment herein, the system adaptor checks whether the attachment update and delete options are supported in the target device. The system adaptor returns a binary value for indicating an availability of the update and delete option.

According to one embodiment herein, the system adaptor performs a delete operation on the old attachment followed by adding the updated attachment to the target device, when the update option is not supported by the system. The system adaptor performs a skip operation, when both the delete and update options are not available at the source device and target device.

According to one embodiment herein, the system adapter lists the current attachments available at the target device. Each attachment is assigned with an attribute value, a file name and a creation/updation time. The creation/updation time is changed at every add and update operation of the attachment.

According to one embodiment herein, the system adapter provides an option for adding and removing links. The system adapter checks for availability of the link addition and removal support at the source computing device and target computing, device.

According to one embodiment herein, the system comprises a core adapter for saving a bulk of old link states between a primary entity and a linked entity in a single transaction. The core adaptor stores the old link states in the database and the poller retrieves the old link states from the database based on history available flag. The old link states are retrieved based from source device if history is available. The old link states are retrieved from database if link history is not available.

According to one embodiment herein, the system further comprises a history interface used by the poller and the system adapter to store the link history and the attachment history in the database.

According to one embodiment herein, a method for processing of attachments during synchronization between a source device and a target device. The method comprises the steps of polling a plurality of attachments by a source device. An old attachment information list and a new attachment information list are received from the source device, after polling event. A current attachment information list is received from the target device. The add attachment operation is performed on the attachment obtained from new attachment information list, when the old attachment information list is different from the new attachment information list and an attachment does not exist in the target device. The update attachment operation is performed on the attachment obtained from new attachment information list that exists in the target, when the old and new attachment information lists are different. The delete operation is performed followed by the add attachment operation on the attachment, when the update operation is not supported at the source device and the target device. Any operation for the attachment is skipped, when a delete operation is not supported and only an add attachment is supported. The delete attachment operation is performed, when the attachment does not exists in the new attachments list and attachment exists in the current attachment information list for each attachment in the old attachment information list. The old state is saved in the database after processing all the attachments in the current attachment information list, for selecting the attachment object by the target device.

According to one embodiment herein, a method for recovering attachments during synchronization between a source device and a target device. The method comprises the steps of storing an attachment index from an incoming list as a sub step number after adding each attachment to a target device. An event is retried during which a failure had occurred. The processing of the first attachment from the incoming list is skipped and the processing is continued with the second attachment in the list, when a failure occurs during an addition of a second attachment after adding one attachment. The failure event is recovered, when a failure happens after adding one attachment and before adding the attachment to the database. The current attachment is acquired from the target device. The first attachment which matches with the file name of the current attachment is acquired while recovering the attachment from the incoming list. The attachment is updated during the system recovery, when the updating times of old and new attachments coming from the source device are different.

According to one embodiment herein, a method for detecting conflicts in attachments during synchronization between the source device and the target device. The method comprises the steps of detecting conflict on per attachment basis, based on a plurality of attachment file names. A changed attachment information list is prepared, by comparing an old attachment and a new attachments list to remove all the attachments having same file name and last update time. An update-delete conflict operation is performed on the attachment, when the attachment update time is different for old and new attachment information lists and an attachment does not exist in the target device. A delete-update conflict operation is performed on the attachment, when the attachment is not present in the old list but the attachment is present in the target device. The delete-delete conflict operation is performed on the attachment, when the attachment is deleted from the source device and also does not exist in the target device.

According to one embodiment herein, the type of conflict comprises an add-add conflict, in which link is added in the source device and the same link exists in the target device; an update-delete conflict, in which the link is updated in the source device, and the same is in deleted in the target device; and a delete-delete conflict, in which the link is deleted in the source device and the same is already deleted in the target device.

According to one embodiment herein, a method and system for synchronization of links and attachments during synchronization between source and target devices. The method comprises getting the "as of state" of the attachment that is old and new attachment information list for the revisions, then the system having history for the attachment constructs "as of state" and send as part of the event and system not having history for the attachment, stores attachment information in the history state table with the source update time information in pact as well as the time of adding attachment from the adapter.

According to one embodiment herein, the synchronization of attachments is required to support bidirectional attachment synchronization (add/remove) for attachments from any system. Normally, systems fails to provide API to get links/attachments, which are added by the integration user, and because of that, the system adapters does storing of the link in their own way in general context table and query it from poller as well as from adapter. The system for attachments synchronization need to move this to the common level, where system provide information whether to store information in database or not and store according.

Considering a scenario where attachment file is updated in the source device (either by remove and add new the with same name, or but changing content) and then a new content needs to be synced to the target device. The steps comprise device1 polls attachment not added by the integration user, device2 gets attachments added by the integration user in the device2 for list1, then for each attachment in the incoming list, duplicate files names which are there in the target device2 are found, duplicate files from the target device are removed, duplicate files are also removed from the List1, to allow it to be added in the target again. Then, for each attachment in the incoming list (device1), if attachment exists in the device2 (list1) skip it, else add attachment in the target device, remove the attachment added by the integration user in list (list2), and for all left attachments added by integration user (in list2), delete attachment from the device2.

According to one embodiment herein, for the synchronization of the attachments, an extra system API is adopted to support fully functional bidirectional synchronization. While synchronizing attachments, the system adapter cheeks for the availability of the attachment history. If attachment history is available, then the system adapter returns true otherwise returns false. Based on the flag result (i.e. true/false), an old attachment state is retrieved from the database for the poller and the old attachment state in stored in the database on the event generation. Similarly, for adapter, based on the flag result (i.e. true/false), the attachment state in stored in the database.

According to one embodiment herein, while synchronizing attachments, the system checks whether the attachment update is supported. If update is supported, then the system returns true otherwise returns false.

According to one embodiment herein, while synchronizing attachments, the system adapter checks whether the attachment update is supported. If update is supported, then the system returns true otherwise returns false.

According to one embodiment herein, while synchronizing attachments, the system adapter checks whether the attachment delete is supported. If delete is supported, then the system adapter returns true otherwise returns false.

According to one embodiment herein, while synchronizing attachments, the system adapter checks for current attachments. If current attachments are available, then the system returns list of all attachments as "EAIAttachment pojo" and sets attribute value with file name "fileName" and creation of update time "creationUpdationTime".

According to one embodiment herein, while synchronizing attachments, the system adapter adds attachments and returns "OIMAttachmentEntityObject" and as part of it, returns the "creationUpdateionTime" of the attachment add operation.

According to one embodiment herein, while synchronizing attachments, the system adapter updates attachments and implements only if update of attachment is supported by the adapter and updates attachment passed as the argument. It be called with the message, attachment exists in the system and update is coming for the attachment.

According to one embodiment herein, while synchronizing attachments, the system deletes attachments if update is not supported. If delete is supported, then delete is called and followed by add. Incase if delete is not supported, then that will result in skipping operation because of the update in the source device. Since update is neither carried out for the attachment nor duplicate file is updated in the system, the skip operation is adopted. This prevents from adding duplicate attachment in the target device because of update from the source.

According to one embodiment herein, while synchronizing attachments, the system adapter deprecates "IAttachmentSupport". The deprecation indicates, it should be avoided, typically because of it being superseded.

According to one embodiment herein, while synchronizing attachments, the system poller checks for available history. If history is available, then the poller gets history as of old and new value list for attachments (attachments irrespective or integration user). If history is not available, then the poller gets all current attachments (attachments irrespective of integration user) in the new list, old list value is set to null for attachments.

According to one embodiment herein, for the synchronization of the links, an extra system API is adopted to support fully to functional bidirectional synchronization. A core adapter performs "IHistorySupport" i.e. "saveOldState", to bulk save all given old state in one transaction. This is required to store two old states for primary entity and the linked entity in one transaction only.

According to one embodiment herein, while synchronizing links a system adapter performs "ILinkSupportNew" i.e. the system adapter checks for available history "isLinkHistoryAvailable". If history is available returns true, otherwise returns false. For poller based on this flag (true/false), the old links state are retrieved from the database and stored the links old state in the database on the event generation. For adapter based on this flag (true/false), the old state is stored in to the database.

According to one embodiment herein, while synchronizing links, the system adapter checks for link remove support "isLinkRemoveSupported". If link remove is supported return true, otherwise return false.

According to one embodiment herein, while synchronizing links, the system adapter gets current links "getCurrentLinks" and no changes are done, and everything remains as per the old interface only.

According to one embodiment herein, while synchronizing links, the system adapter adds inks "addLink", based on the linkedEntityInternalId passed in the arguments.

According to one embodiment herein, while synchronizing links, the system adapter remove link "removeLink", based on the linkedEntityInternalId.

According to one embodiment herein, while synchronizing links, the system adapter gets link type i.e. "getLinkType" and return the List<LinkTypeMeta> where set the link type name as well as link type name of the opposite link type, if this link type automatically has the reverse link type. Example:—For link type of parent there is opposite link type "Child". Adding A as "Parent" of B also means that B is "Child" of A. So for this example it will be two link types meta object as following linkType="Parent" and oppositeLinkType="Child"

linkType="Child" and oppositeLinkType="Parent"

and if there is no opposite link for the link type then set null to oppositeLinkType.

According to one embodiment herein, while synchronizing links, the system potter checks for availability of history. If history is available, get history as of old and new value list for links. If history is not available, no changes are done (given that it's returning all current links which was expected in early approach).

According to one embodiment herein, while synchronizing links and attachments, the history is stored from the puller as well as from the adapter using history interface in the database. Current structure works fine with exception for the following issue fix required. Currently it's being stored for the "sourceEntityInfo" and "targetSystemId", but old state written by the adapter is not accessible by the poller of that system.

According to one embodiment herein, if the system is not supporting attachment history then the current event is stored as the new old state as the new entry in the database with the event time as the last update time in the poller system.

According to one embodiment herein, on successful completion of the event processing, the state is stored into the database, received from the adapter after /update/add/remove operation. The required object is constructed to be stored for create, update, add, remove operations and then stored in one history state object only. In case of failure before writing the old state in the database and after operation in end system, then latest state is added in the database.

FIG. 1 illustrates a block diagram of a system for synchronization of links and attachments between the source and the target devices, according to one embodiment herein. The system 100 for executing synchronization between the source and the target devices comprise a connector framework 105, a process framework 101, a mapping manager 102, a recovery manager 104, a conflict manager 103, a failure manager 107 and an admin module 106. The connector framework 105 further comprises poller components 105a and adapter components 105b. The poller components 105a are responsible for reading the data changes from the source devices. The adapter components 105b are responsible for writing the data to the destination devices. The process framework 101 is responsible for processing the poll event. The process framework 101 further comprises one or more process engine 101a and one or more rules engine 101b such as but not limited to JBOSS, JPDL, Drools, Apache ODE, etc. All the components in the synchronization system are loosely coupled, and hence rules engines 101b are switched easily. Further, the process framework 101 on successful synchronizing event, writes back to the source stating or indicating success and on failure, the process framework 101 passes to failure management component.

According to one embodiment herein, the mapping manager 102 further comprises transformation field mapping services 102a and user mapping services 102b for mapping different fields of source device to corresponding field of target devices. The synchronization system uses XSLT for mapping files.

According to one embodiment herein, the recovery manager 104 is an inbuilt component in the synchronization system. In case of system failure or any unexpected failures, the recovery manager 104 automatically recovers the data. The recovery manager 104 leverages both adapter components 105b and potter components 105a.

According to one embodiment herein, the conflict manager 103 manages all the conflicts occurring during the synchronization. A conflict occurs, when integration finds that the current value of any field of destination does not match with last value of source field. The conflict manager 103 of the synchronization system detects conflict and also provides one or more integration models to resolve the conflict automatically.

According to one embodiment herein, the failure manager 107 manages the entire failed event during synchronization. The failed events are those which failed to write to destination device. The synchronization system of the present disclosure catches those events and creates a failure queue. When an event fails, the failure manager 107 retry by itself up to certain attempt. The entire failed events are notified and are processed after human intervention through the admin module 106.

According to an embodiment herein, the system 100 further comprises a poller module configured for initiating a plurality of events relating to synchronization of links and attachments and a system adapter configured for exchanging attachments and links between the source device and the target device. The system 100 further comprises a database for maintaining information pertaining to the plurality of attachment and links stored in the source device and the target device.

According to an embodiment herein, the system 100 further comprises a data base for storing a context table which is stored with a plurality of attachments and links. The process framework 101 is allowed for querying the table from the poller and the adapter.

Figure 2A:
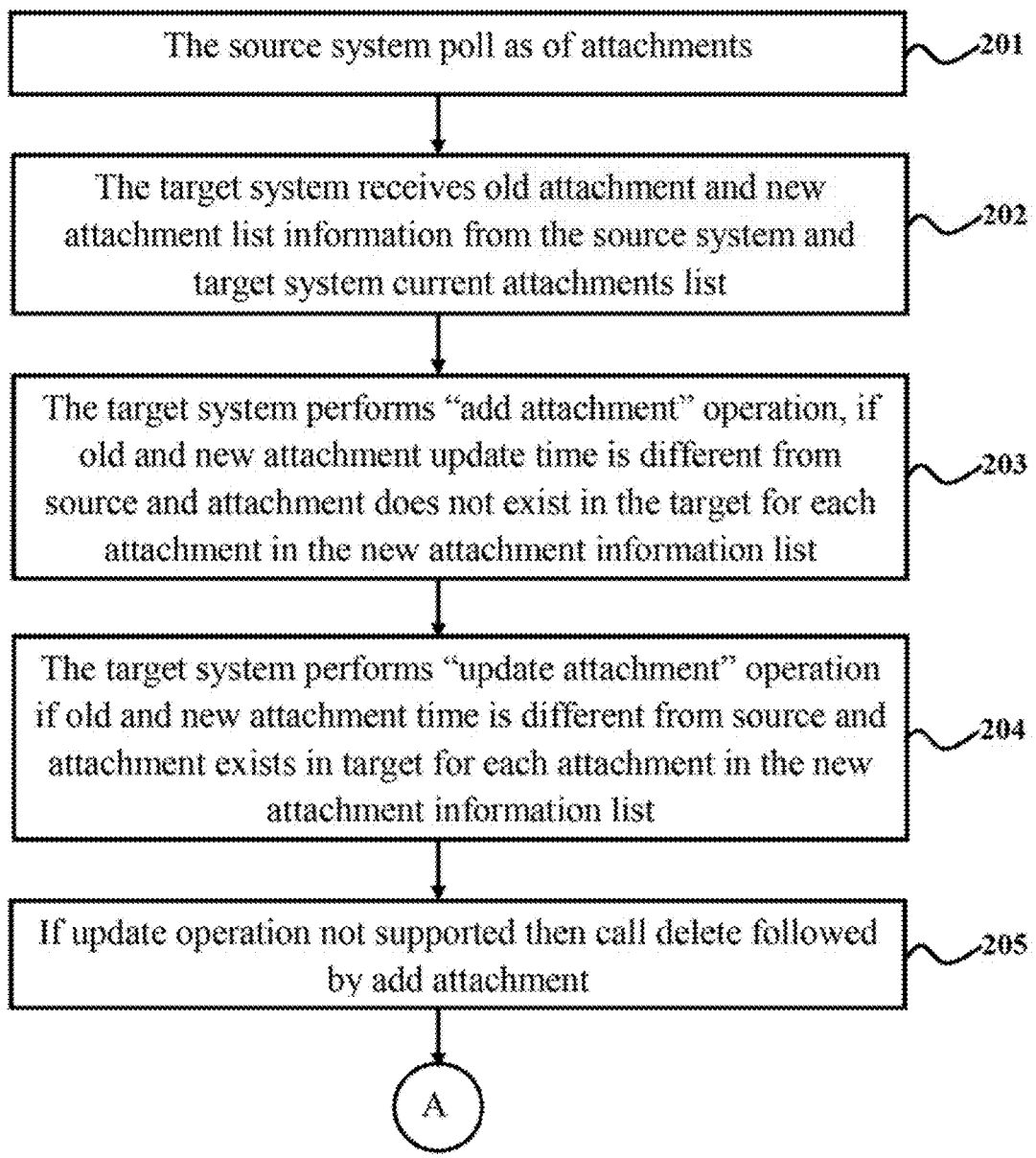
FIG. 2A-FIG. 2B jointly illustrate a flowchart explaining a method for processing of attachments during synchronization between the source and the target devices, according to one embodiment herein.
Figure 2B:
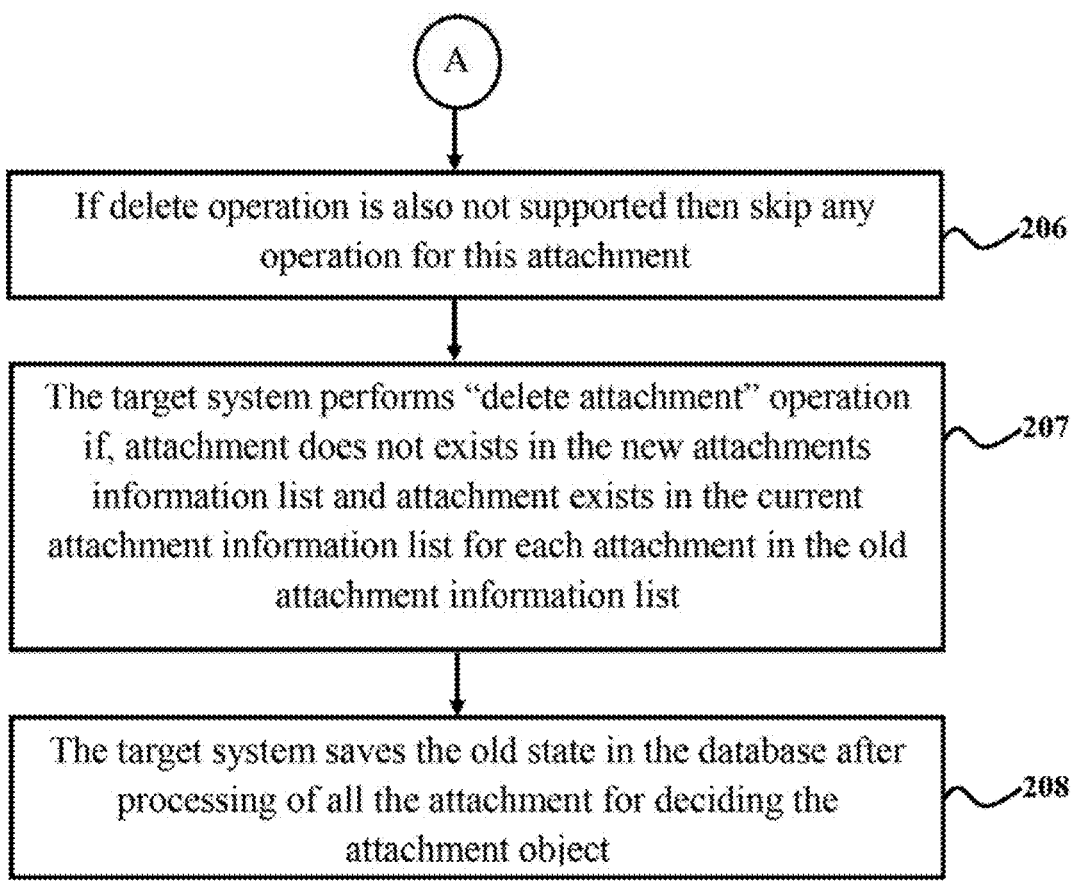

FIG. 2A-FIG. 2B jointly is a flowchart illustrating a method for processing, of attachments dun synchronization between the source and the target devices, according to one embodiment herein. The method comprises the steps of the source system polls of attachments (201), the target device receives "OldAttachmentsList" i.e. old attachment information list from the source device, "NewAttachmentsList" i.e. new attachment information list from the source device and "CurrentAttachmentsList" i.e. target device current attachments list (202); performing "add attachment" operation by the target device, if old and new attachment update time is different from source and attachment does not exist in the target for each attachment in the new attachment information list, i.e.performing "addAttachment" operation for the old and new attachment when update time is different from source and for attachment which are not existing in the target (203); performing "update attachment" operation by the target device, if old and new attachment update time is different from source and attachment exists in the target for each attachment in the new attachment information list (204); calling delete followed by add attachment operation, if update operation not supported (205); skipping any operation for this attachment, if delete is also not supported (in this case only add attachment is supported) (206); performing "delete attachment" by the target device, if attachment does not exists in the new attachments list and attachment exists in the current attachment information list for each attachment in the old attachment information list (207) i.e. for each attachment in old attachment information list: calling "deleteAttachment" if for attachment does not exists in the new attachments list and attachment exists in the "currentAttachmentsList"; and saving the old state in the database after processing of all the attachment for deciding the attachment object by the target device (208).

Figure 3:
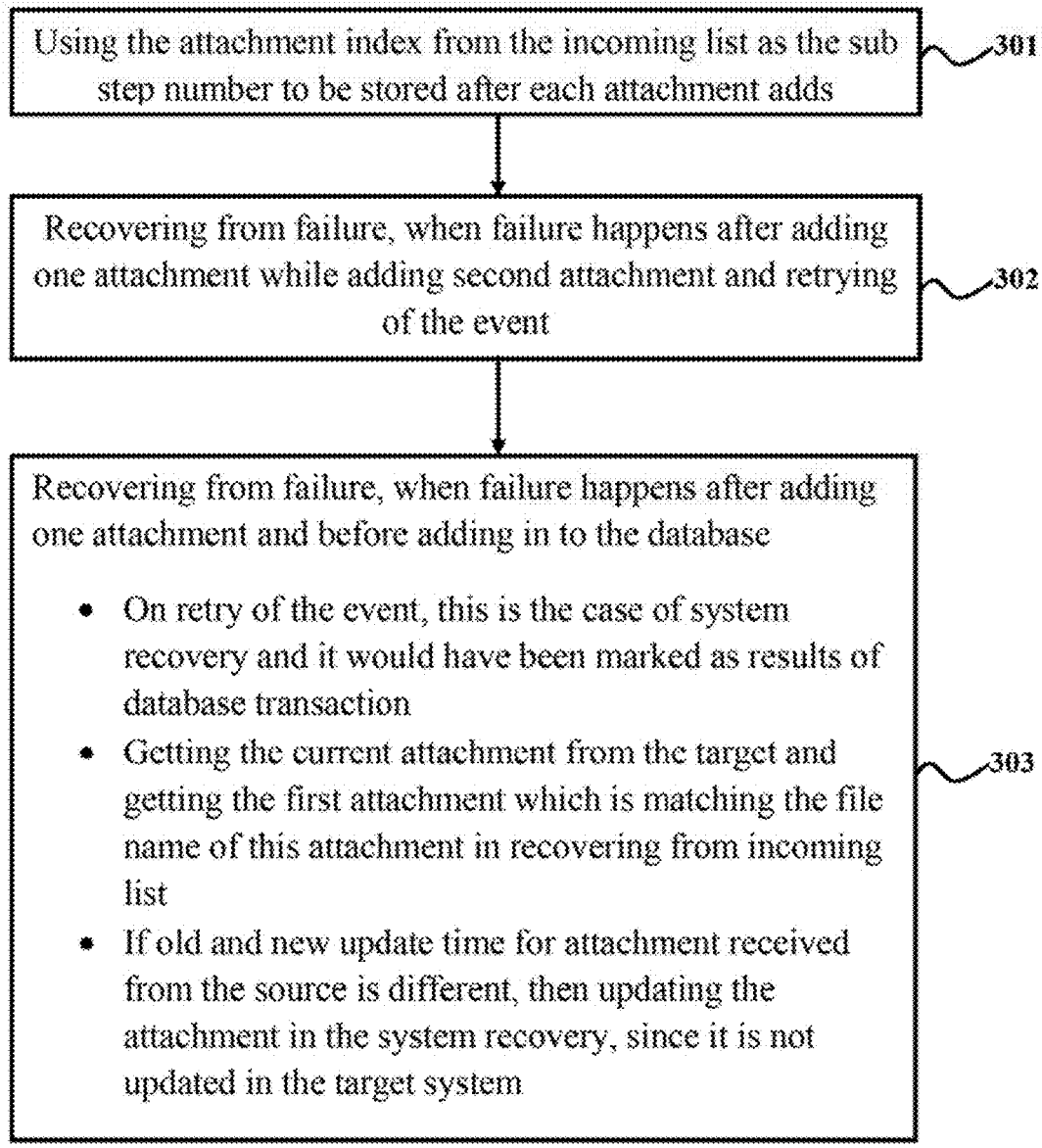
FIG. 3 illustrates a flowchart explaining a method for recovery of attachments during synchronization between the source and the target devices, according to one embodiment herein.

FIG. 3 is a flowchart illustrating a method for recovery of attachments during synchronization between the source and the target devices, according to one embodiment herein. The method for recovery of attachments comprises the steps of: using the attachment index from the incoming list as the sub step number to be stored after each attachment additions (301); recovering from failure when failure happens after adding one attachment while adding second attachment. This is achieved by retrying of the event. On retying, the database sub step is 1, so one attachment from the incoming list is skipped from processing and continued with the second attachment in the list (302); and recovering from failure when failure happens after adding one attachment and before adding in to the database. This is achieved by retrying of the event and this is the case of system recovery and it is marked as results of database transaction, getting the current attachment from the target and getting the first attachment which is matching the file name of this attachment in recovering from the incoming list and if old and new update time for the attachment coming from the source is different, then updating the attachment in the system recovery, since it is not updated in target device (303).

Figure 4:
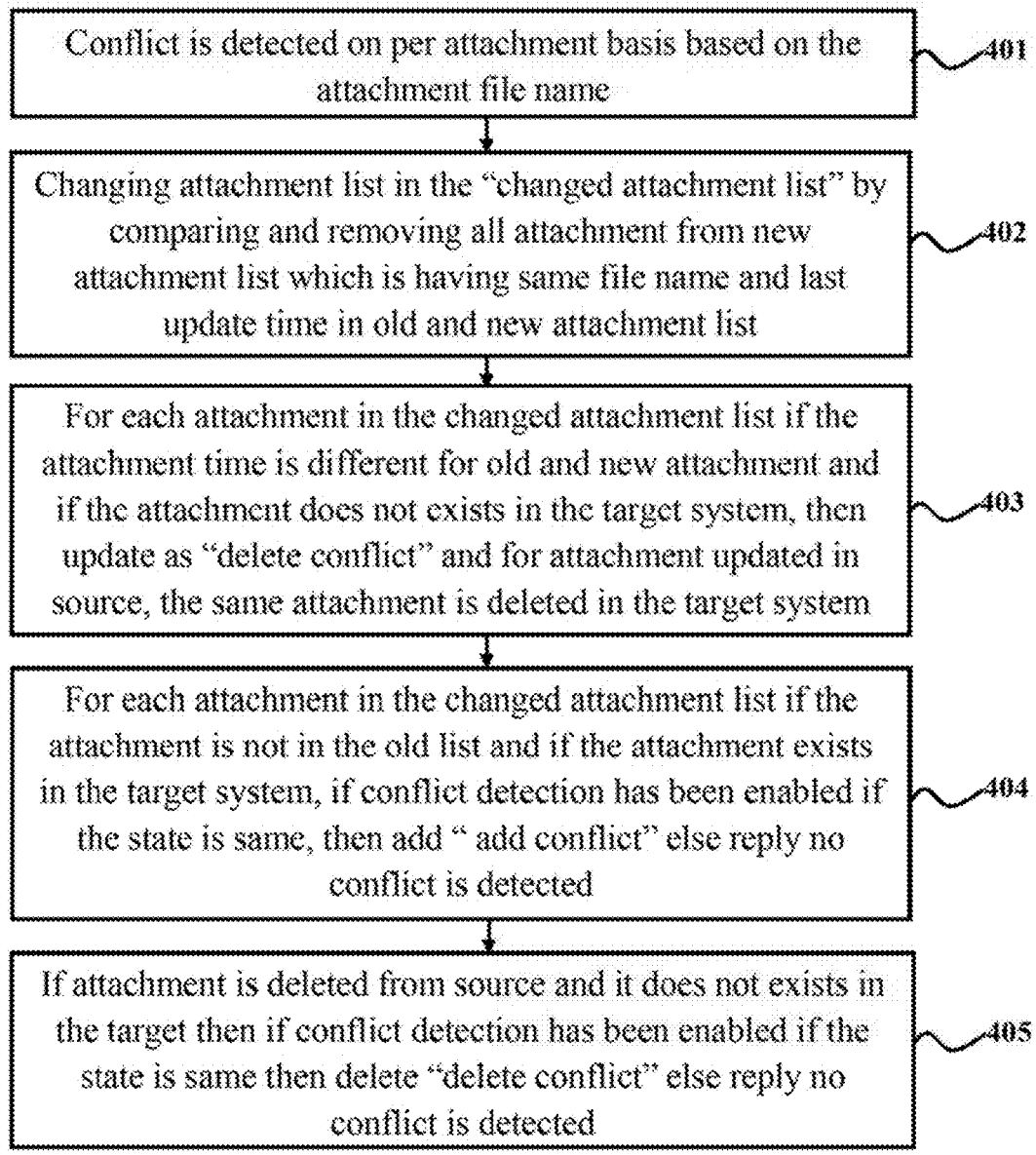
FIG. 4 illustrates a flowchart explaining a method for to detecting conflicts in attachments during synchronization between the source and the target devices, according to one embodiment herein.

FIG. 4 is a flowchart illustrating a method for detecting conflicts in attachments during synchronization between the source and the target devices, according to one embodiment herein. The attachment conflict detection supported cases comprises add-add conflict, in which attachment is added in the source device, which already exists in the target device update-delete conflict, in which attachment is updated in the source device, and the same is deleted in the target device; and delete-delete conflict, in which the attachment is deleted in the source device, which is already deleted in the target device. The method for detecting conflicts in attachments comprises the steps of: detecting conflict on per the attachment basis, based on their attachment file names (401); changing attachment information list "ChangedAttachmentList", by comparing and removing all attachment from "NewAttachmentsList" which are having same file name and last update time in old and new attachments list (402); for each attachment in the changed attachment information list, if the attachment update time is different for old and new attachment and if the attachment does not exists in the target device, then update as "delete conflict" and for attachment updated in source, the same attachment is deleted in the target device (403); for each attachment in the changed attachment information list, if the attachment is not in the old list and if the attachment exists in the target device if conflict detection has been enabled if the state is same, then add "add conflict" else reply no conflict is detected (404); and if attachment is deleted from source and it does not exists in the target, then if conflict detection has been enabled if the state is same then delete "delete conflict" else reply no conflict is detected (405).

According to one embodiment herein, the method for detecting conflicts in links during synchronization between two systems is provided. The links conflict detection supported cases comprises add-add conflict, in which link is added in the source device, which already exists in the target device; update-delete conflict, in which the link is updated in the source device, and the same is in deleted in the target device; and delete-delete conflict, in which the link is deleted in the source device, which is already deleted in the target device.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims to be submitted at the time of filing the complete specification.

Although the embodiments herein are described with various specific embodiments, it will be obvious for a person skilled in the art to practice the embodiments herein with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A system for synchronizing links and attachments between two computing devices comprising:
   a connector framework configured for providing connectivity between a source device and a target device;
   a process framework configured for processing a polling event;
   a mapping manager configured for mapping a plurality of fields of the source device to the corresponding fields of the target device;
   a recovery manager configured for recovering data in case of system failure or any unexpected failures;
   a conflict manager configured for managing a plurality of conflicts occurring during synchronization and producing at least one integration model to resolve the plurality of conflicts automatically, and wherein the plurality of conflict comprises an add-add conflict in which link is added in the source device and the same link exists in the target device an update-delete conflict in which the link is updated in the source device and the same link is deleted in the target device and a delete-delete conflict in which the link is deleted in the source device and the same link is already deleted in the target device; and failure manager configured to manage a plurality of failed events occurring during synchronization, and wherein the failed events are stored in a failure queue and are accordingly processed by human intervention through an admin module;

a poller module configured for initiating a plurality of events relating to synchronization of links and attachments and an system adapter configured for exchanging attachments and links between the source device and the target device; a database for maintaining information pertaining to the plurality of attachment and links stored in the source device and the target device;

an Application Program Interface (API) is adopted for supporting a bi-directional function support, and wherein the API checks for an availability of an attachment history for obtaining an old list and a new list of the attachments, and wherein an old attachment information list is retrieved from the source device when the attachment history is available, and wherein the old attachment information list is stored in the database on an event generation, when the attachment history is not available a database for storing a context table, and wherein the context table is stored with a plurality of attachments and links, and wherein the process frame work is allowed for querying the table from the poller module and the adapter module;

wherein the connector framework comprises a plurality of poller components for reading data changes from the source system and a plurality of adapter components for writing the data to the target system;the process framework comprises a process engine and a rules engine, wherein the process framework writes back the target entity link to the source device on successful synchronizing event, wherein the rules engine, passes the failure event to failure manager.

2. The system according to claim 1, wherein the mapping manager comprises transformation field mapping services and user mapping services for mapping different fields of the source device to corresponding field of the target devices.

3. The system according to claim 1, wherein the system adaptor receives an old attachment information list and a new attachment information list from the source device and a current attachment information list from the target device, wherein the old attachment information list and the new attachment information list are compared and the attachments are updated on the target device, according to the current attachment information list.

4. The system according to claim 1, wherein the system adaptor checks whether the attachment update and delete options are supported in the target device, and wherein the system adaptor returns a binary value for indicating an availability of the update and delete options.

5. The system according to claim 1, wherein the system adaptor performs a delete operation on the old attachment followed by adding the updated attachment to the target device, when the update option is not supported by the system, and wherein the system adaptor performs a skip operation, when both the delete and update options are not available at the source device and the target device.

6. The system according to claim 1, wherein the system adapter lists the current attachments available at the target device and wherein each attachment is assigned with an attribute value, a tile name and a creation/updation time, and wherein the creation/updation time is changed at every add and update operation of the attachment.

7. The system according to claim 1, wherein the system adapter provides an option for adding and removing links, and wherein the system adapter checks for an availability of the link addition and removal support at the source computing device and the target computing device.

8. The system according to claim 1, further comprises a core adapter for saving a hulk of old link states between a primary entity and a linked entity in a single transaction, and wherein the core adaptor stores the old link states in the database and the poller retrieves the old link states from the database based on history available flag, and wherein the old link states are retrieved based from source device if history is available, and wherein old link states are retrieved from database if link history is not available.

9. The system according to claim 1, further comprises a history interface used by the poller module and the system adapter module to store the link history and the attachment history in the database.

10. A method for processing attachments during synchronization between a source device and a target device comprises:

polling a plurality of attachments by a source device;

receiving an old attachment information list and a new attachment information list from the source device;

receiving a current attachment information list from the target device;

performing an add attachment operation on the attachment obtained from new attachment information list, when the old attachment information list is different from the new attachment information list and an attachment does not exist in the target device;

performing an update attachment operation on the attachment obtained from new attachment information list that exists in the target when the old and new attachment information lists are different;

performing a delete operation followed by an add attachment operation on the attachment, when the update operation is not supported at the source device and the target device;

skipping any operation for the attachment, when the delete operation is not supported and only the add attachment operation is supported;

performing a delete attachment operation, when the attachment does not exists in the new attachments list and attachment exists in the current attachment information list for each attachment in the old attachment information list; and detecting conflicts in attachments during synchronization between the source device and the target device, and wherein step of detecting conflicts in attachments comprising steps of;

detecting a conflict on per attachment basis, based on a plurality of attachment file names;

preparing a changed attachment information list by comparing an old attachment and a new attachments list to remove all the attachments having a same file name and last update time;

performing an update-delete conflict operation on the attachment, when the attachment update time is different for the old and new attachment information lists and when an attachment does not exist in the target device;

performing a delete-update conflict operation on the attachment, when the attachment is not in the old list and the attachment exists in the target device;

performing a delete-delete conflict operation the attachment, when the attachment is deleted from source and also does not exist in the target; and saving the old state in the database after processing all the attachments in the current attachment information list, for selecting the attachment object by the target device.

11. A method for recovering attachments during synchronization between a source device and a target device, the method comprising steps of:

storing an attachment index from an incoming list as a sub step number after adding each attachment to a target device;

retrying an event during which a failure had occurred;

skipping a processing of first attachment from the incoming list and continuing with the second attachment in the list, when a failure occurs during an addition of a second attachment after adding one attachment;

recovering a failure event, when a failure happens after adding one attachment to the list but before adding the attachment to the database;

acquiring a current attachment from the target device;

acquiring the first attachment which matches with the file name of the current attachment obtained while recovering the attachment from the incoming list; and updating the attachment during the system recovery, when the update time of old and new attachments coming from the source device is different.

12. The method according to claim 10, wherein the type of conflict comprises:

add-add conflict, in which link is added in the source device and the same link exists in the target device;

update-delete conflict, in which the link is updated in the source device, and the same link is deleted in the target device; and delete-delete conflict, in which the link is deleted in the source device and the same link is already deleted in the target device.

* * * * *